A. R. CONNER.
DIRIGIBLE HEADLIGHT.
APPLICATION FILED JAN. 26, 1914.
1,145,750.
Patented July 6, 1915.
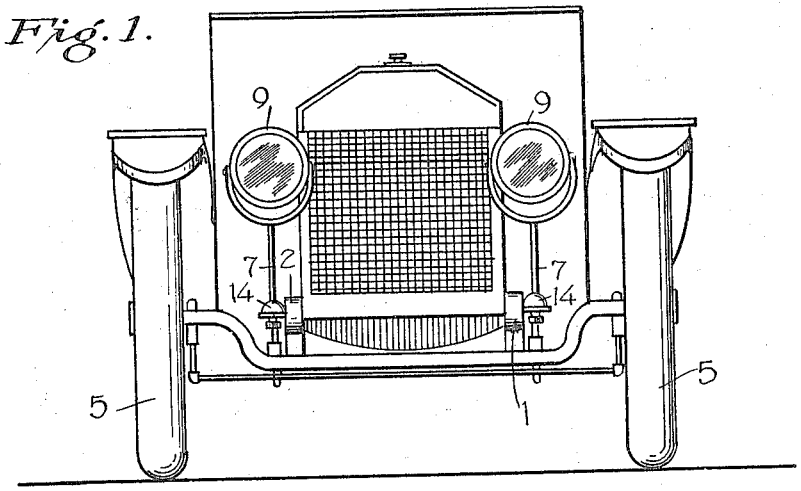
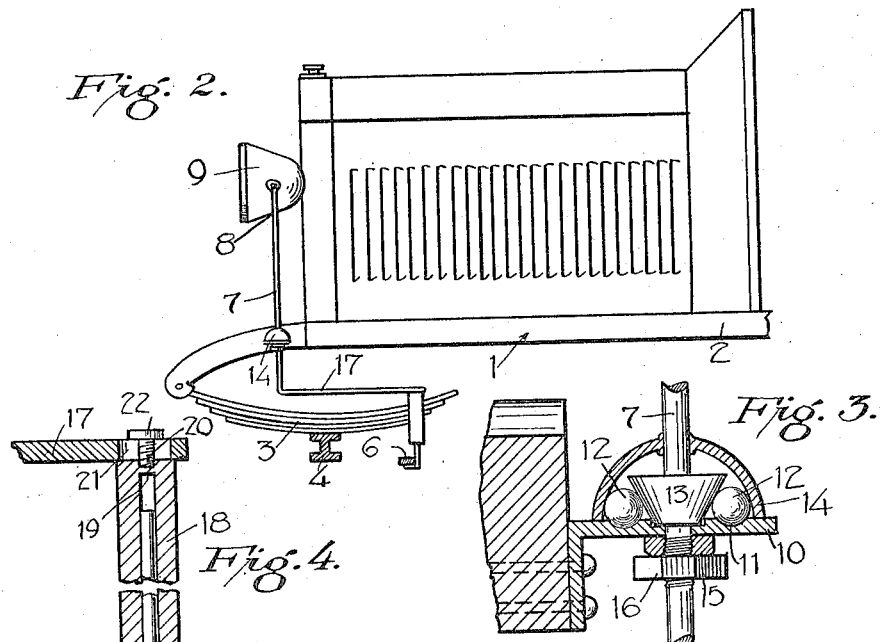
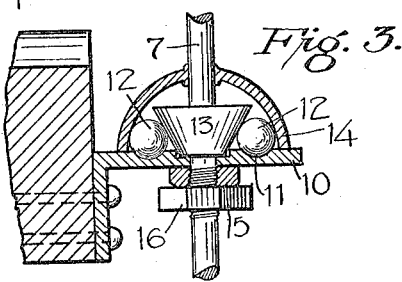
Inventor
A. R. Conner

UNITED STATES PATENT OFFICE.

AMBER R. CONNER, OF MEREDITH CENTER, NEW HAMPSHIRE.

DIRIGIBLE HEADLIGHT.

1,145,750.

Specification of Letters Patent. Patented July 6, 1915.

Application filed January 26, 1914. Serial No. 814,542.

*To all whom it may concern:*

Be it known that I, AMBER R. CONNER, a citizen of the United States, residing at Meredith Center, in the county of Belknap and State of New Hampshire, have invented certain new and useful Improvements in Dirigible Headlights; and I do hereby declare the following to be a full, clear, and exact description of the invention, such as will enable others skilled in the art to which it appertains to make and use the same.

The primary object of this invention is to provide an extremely simple and practical dirigible or automatic headlight for vehicles, which will turn with the steering wheels so as to throw its rays always in the path of the vehicle.

Another and more specific object of the invention is to provide an automatic headlight especially adapted for motor vehicles, having a swiveled standard supporting the light, and means connecting the standard with the steering rod, so that a longitudinal movement thereof will rotate the standard.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a front elevation of an automobile equipped with my improved headlight, Fig. 2 is a fragmentary side elevation of an automobile, showing the headlight applied in position thereon, Fig. 3 is a detail view, partly in elevation and partly in section, showing the manner of mounting the lamp standard on the chassis, and Fig. 4 is a detail sectional view, showing the telescopic connection between the steering rod and arm of the standard.

Referring in detail to the drawings by numerals, 1 designates an automobile chassis having side bars 2 and being supported at its forward end on springs 3 mounted on an axle 4. The steering wheels 5 are controlled by the longitudinally movable steering rod 6 which moves in a direction opposite to that in which the vehicle turns.

In carrying out my invention, I provide a lamp standard 7 forked at its upper end, as indicated by the numeral 8, to support a lamp 9. The standard is secured to one of the side bars 2 of the chassis by a ballbearing bracket 10. This bracket has a horizontal supporting plate formed on its upper side with a raceway 11 in which are arranged bearing balls 12. The standard 7 is provided with a cone 13 which engages the inner sides of the balls. A cap or cover 14, semispherical in shape, is ridgidly secured to the standard 7 and houses the bearing cone 13 and balls 12. The cover also holds the balls properly within the raceway 11. The standard 7 is held against upward movement relative to the bearing 10 by a clamping nut 15 threaded upon said standard into engagement with the underside of the horizontal plate of the bracket.

16 designates a lock nut which holds the clamping nut 15 securedly against accidental loosening.

A horizontal rearwardly extending arm 17 is formed upon the lower ends of the standard 7 and terminates over the steering rod 6. A depending sleeve 18 open at its lower end and closed at its upper end by a wall 19, is connected to the rear terminal of the arm 17 by a stud 20 which extends through a longitudinal slot 21 formed in the arm. The stud is provided with a head 22 which engages the upper face of the arm, as clearly shown in Fig. 4. A vertical arm or standard 23 is bolted to the steering rod 6, as indicated by the numeral 24, and projects into the sleeve 18, so that when the steering rod is shifted longitudinally, the standard 7 will be turned. The telescopic connection, formed by the sleeve 18 and arm 23, insures a proper operation of the device irrespective of the distance between the chassis and axle 4. The sliding connection between the sleeve 18 and arm 17 is necessary to prevent the standard 23 binding against the interior of the sleeve 18, due to the movement of the arm 17 about the standard 7, as a pivot.

From the foregoing description taken in connection with the accompanying drawings, it will be seen that when the steering rod 6 is shifted to the left to turn the vehicle to the right, the standard 7 will be rotated an amount corresponding to the movement of the steering rod and cause the lamp to throw its rays directly in the path of the vehicle.

While I have shown and described the preferred embodiment of my invention, it will be understood that minor changes in construction, combination and arrangement of parts may be made without departing from the spirit and scope of the invention as claimed.

Having thus described my invention, I claim:—

In a dirigible headlight, an angle bracket, a plate carried by said bracket, said plate formed with a raceway having a recess centrally between said raceway, ball bearings to be placed in said raceway, a standard extending centrally through said plate, a frusto-conical bearing on said standard and its lower face resting in said recess and its sides engaging with the outer surface of the ball bearings, a cover secured to said standard over said bearing and ball bearings, and adjusting means on the lower terminal of said standard for adjusting the frusto-conical bearing against the ball bearings.

In testimony whereof I affix my signature in presence of two witnesses.

AMBER R. CONNER.

Witnesses:
JAMES G. SULLIVAN,
BERTRAM BLAISDELL.

Copies of this patent may be obtained for five cents each, by addressing the "Commissioner of Patents, Washington, D. C."